United States Patent [19]

Bleckmann

[11] 4,066,201

[45] Jan. 3, 1978

[54] METHOD OF JOINING METAL PARTS

[76] Inventor: Richard Bleckmann, Imbergstrasse 24, Salzburg, Austria

[21] Appl. No.: 740,737

[22] Filed: Nov. 10, 1976

[51] Int. Cl.² ............................................. B23K 21/00
[52] U.S. Cl. ................................... 228/115; 228/136; 228/178; 228/183; 29/505; 29/611
[58] Field of Search ................. 29/432, 432.1, 432.2, 29/505, 521, 611; 228/135, 136, 178, 185, 183, 115

[56] References Cited

U.S. PATENT DOCUMENTS

| | | | |
|---|---|---|---|
| 1,379,036 | 5/1921 | Moorhead | 29/432 X |
| 2,290,554 | 7/1942 | Hack | 228/136 X |
| 2,874,942 | 2/1959 | Rieppel et al. | 228/115 X |
| 3,032,861 | 5/1962 | Foster | 29/611 |
| 3,376,060 | 4/1968 | Tomika | 29/432 X |
| 3,761,007 | 9/1973 | Richter | 228/2.5 |
| 4,008,845 | 2/1977 | Bleckmann | 228/136 |

Primary Examiner—Harold D. Whitehead
Assistant Examiner—K. J. Ramsey
Attorney, Agent, or Firm—Fleit & Jacobson

[57] ABSTRACT

A method of joining metal elements such as heating tubes, pipes, rods, metal cords, or other lengthy elements having similar profiles, with a plate or other flat, molded, metal surface by use of a wire structure which is affixed to at least one of the metal elements at a great number of places.

16 Claims, 29 Drawing Figures

METHOD OF JOINING METAL PARTS

BACKGROUND OF THE INVENTION

Although it is well-known that elements such as heating tubes, or other elements having cord profiles, can be soldered onto holding plates or heat transmitting plates, these methods involve a considerable consumption of labor. In addition, they can be applied only when specific metals or alloys are used for the jacket of the heating tube element or for the cord profile element, as well as for the heat transmitting plate. Furthermore, there is a danger that the components of the heating tubes may be damaged by the heat which develops during the soldering process, or that the materials of these structures may be affected in other detrimental ways.

It is also well-known that during the installation of the heating elements for appliances such as coffee percolators or the like, a tubular heating element, which has been bent in the shape of a horseshoe, and a water pipe have to be attached to each other by a suitable cold binding method to each other and then, subsequently, to a holding plate. In order to accomplish this, flanges are stamped out of the holding plate, which then are used to hold the series of profiles presented by the heating elements and the water pipes.

Furthermore, the German Pat. No. 2,336,149, laid open for inspection, gives a method of masked joining of relatively hard parts made of metal with relatively soft parts made of metal. In this method, before the two metallic parts are pressed together, a metallic anchor element in the form of a wire spiral is soldered onto the hard metallic parts. The hardness of the material of this anchor element is higher than that of the soft metallic parts and lower than, or equal to, the hardness of the hard metallic parts.

When the joints of the kind described above involving materials with unequal thermal coefficients of expansion are exposed to multiple cycles of substantial temperature changes, as is typically the case with heating appliances, the joint very often deteriorates or cracks and the integrity of the joint is subsequently affected. This problem is further complicated by the requirement to maintain a maximum surface contact between the heater and plate surface, as well as the requirement to provide a constantly acting elastic force on the heating tube so that an even transmission of heat may be achieved. At present, this problem could be solved only partly because in the above-given example of the stamped-out holders, which are bent around the heating element and pressed onto it, the flanges stretch as time goes by and consequently fail to provide the corresponding constant heavy pressure which could ensure the corresponding transmission of heat.

Consequently, it is an object of the invention to provide a method of joining together substantially long elements with each other and with a metal plate, such as a heat transmitting plate or a similarly shaped element made of metal, which will both result in a reliable joint at minimum expense and will guarantee a uniform heating operation of the appliance for a reasonable length of time.

Also, to the extent that wire-shaped joining elements are used according to the presently known techniques, for example the method presented in German Pat. No. 2,336,149, these joining elements were used exclusively for rigid mechanical fastening together of the parts. However, they did not provide any elastic pressure, namely such elastic pressure which would be evenly applied over the entire length of the tube or of the track-like element and which would apply continuous pressure independent of variations in the diameter of the tube, which are unavoidable in tubular heating elements.

SUMMARY OF THE INVENTION

The method according to the present invention, provides that the windings of a wire coil turn around the profile of the tube, or around the series of several profiles, without requiring any flanges or strips. In performing the press procedure of the invention, each individual winding of the wire coil is stretched elastically and the superfluous length is pressed in the form of a foot-shaped loop into the plate or into the molded element and firmly anchored there. Should it happen that someplace over the length of the pipe profile the diameter is somewhat larger or smaller, the only result of it is that the foot loop turns out to be correspondingly somewhat smaller or larger. Yet, the force with which that part of the wire coil which extends between two foot coils and around the profile of the tube presses against the tube remains constant. It can easily be seen that this specific feature of the present invention is particularly important in the case of the arrangement of several profiles, for example, in the case of a tubular heating element and a running water pipe, because when a grouping of pipe profiles are lying next to each other or on top of each other, variations in the composite profile cannot be avoided.

Furthermore, it appears that the heat transmitting properties of the groupings, which are produced according to the method of the invention, are not only exceptionally good because of the even pressure, but also because each individual wire winding with its relatively large anchoring loop, operates by itself as a protruding heat conductor. This means that the radiating heat, for example of a tubular heating element diminishes in the direction from the heat conducting plate to the external side lying opposite it and is conducted instead by the wire coil in the direction of the heat conducting plate. The effect can be intensified even more when a wire grid is used, which is impressed over a large area on the heat conducting plate, for example, into the aluminum base of a cooking utensil.

However, it is understood that the method can be applied advantageously in a universal way to join long elements of tube profiles or elements of cord-pressed profiles, even when there are not problems concerning heat transmission or conduction. Also, when the joints described above which are produced by known methods are subjected to mechanical stresses, for example shocks produced by dropping, they have shown to be substantially degraded. Such manifestations caused by metal fatigue have not been observed in the case of joints made in accordance with the method of the present invention. This is because the coiling of the wire-shaped joining members produces a constant tension or elastic spring force, which gives the joint both a certain amount of pliancy as well as a constant pressure forcing the parts into intimate contact.

BRIEF DESCRIPTION OF THE DRAWINGS

FIG. 29 is a sectional view of the elements shown in FIG. 28 after the cover has been pressed on.

DETAILED DESCRIPTION OF THE PREFERRED EMBODIMENT

Figure 1:
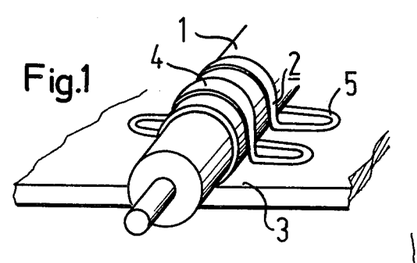
FIG. 1 is a perspective view of a portion of tubular heat element fastened to a plate by means of the method of the invention.

Referring now to FIG. 1, elements are shown which consist of a tubular heating element 1 and a wire coil 2 which can be fastened not only onto a metallic plate 3 but also onto any element of any shape whatever. In the case of the types of designs shown in FIGS. 1 to 3, the tubular heating 1 has an outer jacket made of chromium-nickel steel. The wire coil 2 consists of an alloy of aluminum and magnesium and has a diameter approximately 1½ times that of the heating element. The grouping is pressed onto a sheet 3 made of pure aluminum. In this method of pressure attachment, each winding of the wire coil 2 is attached tightly to the tubular heating element 1 and pressed flat against it, as shown typically at 4. The overlapping part of the length of each winding of the wire coil 2 forms a foot loop 5 in an unexpected way. The foot loops are impressed into the material of the aluminum sheet 3. However, at the same time the material of the aluminum sheet 3 flows into the loop 5 and is anchored in each loop like the head of a rivet. At the same time, the running tail of each winding is impressed in the aluminum sheet 3 between the tubular heating element 1 and the aluminum sheet 3. As a result, the aluminum flows around the round-shaped transverse section of the wire coil 2 and is correspondingly anchored.

Figure 2:
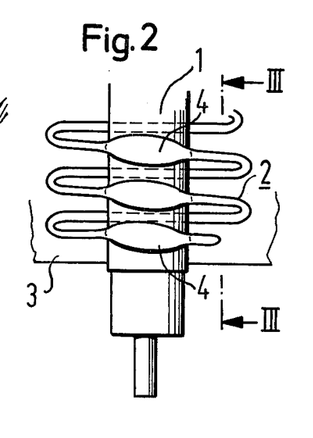
FIG. 2 is a plan view of the elements shown in FIG. 1.
Figure 3:
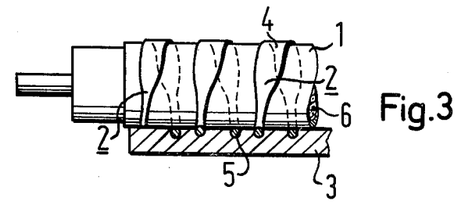
FIG. 3 is a sectional view in the direction of the arrows III—III in FIG. 2.

In the type of design shown in FIGS. 1 to 3, the jacket of the tubular heating element 1 consists of material which is harder than the wire coil 2. The wire coil 2 consists, in turn, of material which is harder than the aluminum sheet 3. The flat pressed part 4 of the wire coil 2 provides for good transmission of heat from the tubular heating element 1 to the wire coil 2, and as a result the heat is subsequently transmitted through the foot loop 5 to the aluminum sheet 32. Additional transmission of heat is provided through the elastic pressing of the jacket of the tubular heating element onto the aluminum sheet 3 as a result of the grid potential of the windings of the wire coil 2.

When the tubular heating element 1 is pressed on, the insulation material 6, which may be generally magnesium oxide, is compressed at the same time. This compression of the insulating material tends to eliminate any moisture in that material which may have been there at fabrication or which may have subsequently condensed during the working process. Subsequent condensation is generally produced when a straight tubular heating element 1, containing insulation material which has already been compressed, is bent, for example, in the form of a horseshoe or U-shape, which results in general in a situation where the insulating material is loosened in the bent part. During the pressing process, for example, with a die press, the jacket of the tubular heating element is pressed together at the places with loosened insulating material. This also results in the jacket having a smaller diameter at that place and in the case of the known fastening methods, the effect of the reduction of the diameter of the tubular heat element 1 is that the material used for fastening at the point of change of diameter cannot follow without an other fabrication step. But in the method according to the present invention, the corresponding windings of the wire coil 2 are pressed tightly and firmly on the jacket of the tubular heating element regardless of the diameter and, as a result, the foot loops 5 are freely enlarged to some extent at these places. Consequently, the final effect is that the tubular heating element 1 is pressed on and attached to the aluminum sheet 3 evenly over its entire length.

Figure 4:
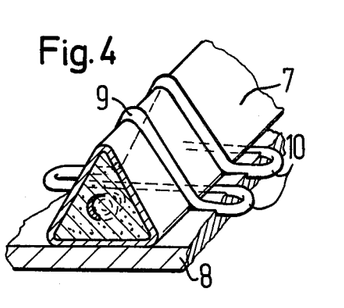
FIG. 4 is a perspective view of a tubular heat element fastened to a plate by means of the present invention.
Figure 5:
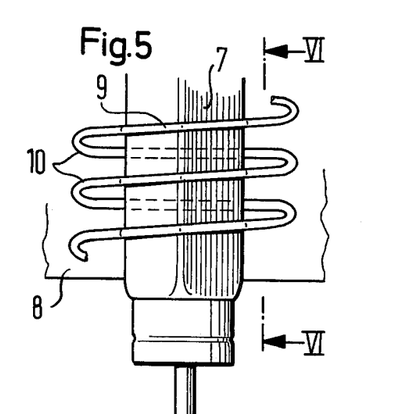
FIG. 5 is a plan view of the elements shown in FIG. 4.
Figure 6:
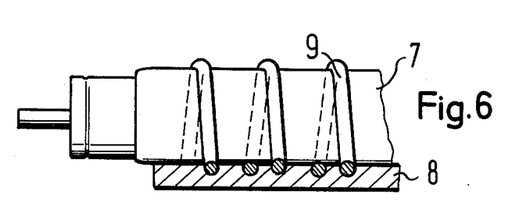
FIG. 6 is a sectional view in the direction of the arrows VI—VI in FIG. 5.

FIGS. 4 to 6 show another example of elements being joined by a variation of the present invention, in which a tubular heating element 7 is pressed onto the base 8 of a cooking utensil, for example an electric frying pan. The tubular heating element 7 has in the initial stage a round jacket tube made of pure aluminum, with a diameter of 10 millimeters. The coil 9 consists of an aluminum-magnesium alloy. Its diameter is 15.8 millimeters. The diameter of the wire forming the coil 9 is 1 millimeter. In this case, the coil wire is harder than the jacket tube of the tubular heating element 7 and the base of the cooking utensil 8, which is also made of aluminum. At the impression of the grouping from the coil and the tubular heating element, the tubular heating element 7 is pressed into a triangular cross section by the corresponding shape of the press. As a result of this pressing, on the one hand the insulating material in the tubular heating element 7 is compressed, and, on the other hand, the contact surface of the tubular heating element is enlarged on the base 8 in the triangular form. As a result of this enlargement of the transverse section, together with the foot loop 10 pressed into the base 8 at the side, the transmission of heat to the relatively thin base 8 of the cooking utensil is improved substantially as compared to any previously known designs. The coil wire 9 is also pressed, because of its greater hardness, into the jacket of the tubular heating element 7, so that the tubular heating element 7 is securely fastened or fixed exceedingly well.

Figure 7:
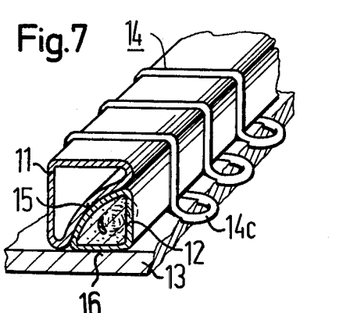
FIG. 7 is a perspective view of a portion of the joining together of a water pipe and a tubular heating element with a heat conducting plate.
Figure 8:
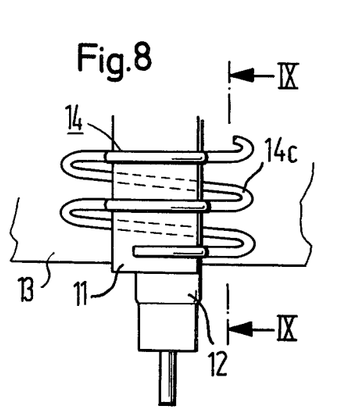
FIG. 8 is a plan view of the elements shown in FIG. 7.
Figure 9:
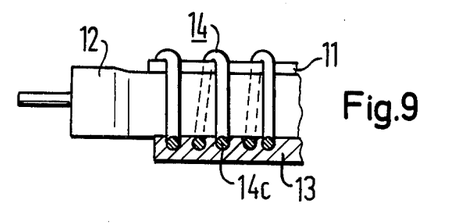
FIG. 9 is a sectional view in the direction of the arrows IX—IX in FIG. 8.

A further particular advantage of the method according to the invention lies in the fact that several unequal profiles can be fastened together onto a heat transmitting plate or holding plate. This embodiment is shown in FIGS. 7 to 9, where a water flow tube 11 is fastened together with a tubular heating element 12 onto a base plate 13. An assembly of this type is utilized, for example, as a flow heater in coffee percolators. The plate 13 in that case may also serve as both the base plate and a warming plate upon which the coffee pot rests, and the grouping consisting of the water tube 11 and the tubular heating element 12 is then fastened on the lower side of the plate 13.

In the case of the designs shown in FIGS. 7 to 9, a water tube 11 and a tubular heating element 12 are placed next to each other and inserted in a wire coil 14. As a result, the wire coil 14 has a larger circumference than the grouping made of the tube profiles placed next to each other. The profile elements 11 and 12 can be bent immediately into a horseshoe form, as is usually done in the case of water flow heaters for coffee percolators. When, for example in this case, the grouping is pressed on the plate 13 by means of a die, then the cross section profile of the water flow tube 11 is pressed around that of the tubular heating element 12. The result is that a wide contact surface 15 is formed between the water tube 11 profile and the tubular heating element 12 and an additional contact surface 16 is formed between the tubular heating element 12 and the plate 13. This means that the optimal heat transmission properties are obtained in the passage of heat from the tubular heating element 12 to the water tube 11 and also from the tubular heating element 12 to the warming plate 13. At the same time, wide loops 14C are pressed out of each winding of the wire coil, again without any special arrangements, which extend to the side and can be pressed into the plate 13 at any time according to the setting of the press. However, these loops can also serve as welding plate 13 by use of the well-known process of roll seam welding if desired. The heat which reaches the free upright side of the tubular heating element 12 is conducted through the wire coil 14 on the one hand to the plate 13 and on the other hand to the water tube 11, so that the loses of heat due to radiation in the given design are reduced to a minimum.

Both the jacket of the tubular heating element and the water tube are made of aluminum in the embodiments shown in FIGS. 7 to 9 and the wire coil was made of chromium-nickel steel. This grouping was then pressed into an aluminum sheet.

It should be pointed out in particular that in the illustrated embodiments, aluminum is an ideal material, because it not only has good heat conducting properties but also does not corrode as, for example, do copper alloys. However, up to now there are no known methods of fastening aluminum profiles or aluminum plates reliably in such a way that it would provide a guarantee of satisfactory service over many years of use while providing a constant elastic contact impression in order to maintain the appropriate heat conducting properties. Even though the method according to the invention results in substantial savings in manufacturing, as shown in the preceeding examples, it provides even further advantages in the form of reliability and efficiency which are not presently achievable by any known methods.

Figure 10:
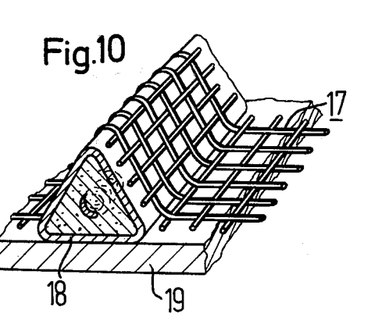
FIG. 10 is a perspective view of a tubular heater joined to a plate by a wire grid using the method of the present invention.
Figure 11:
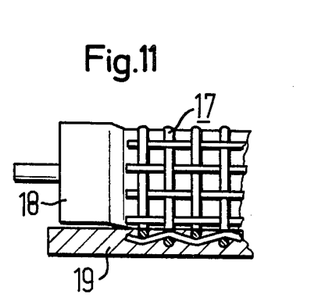
FIG. 11 is a plan view of the end of the elements shown in FIG. 10.

Referring now to FIGS. 10 and 11, a wire lattice 17 is used in further variations on the preferred embodiment of the present invention. This type of design is advantageous particularly when it is desired to achieve heat distribution over a large area, or when it is desired to strength the sheet metal, especially in the case of thin-walled sheets, and to distribute the thermal or mechanical forces which in combination affect a larger area of the sheet metal, or when at the same time several members of the joint are to be fastened next to each other or at a distance from each other on a plate of a partition of a container or on a mold element.

In the types of design shown in FIGS. 10 and 11, the jacket of the tubular heating element 18 and of the base 19 of a cooking utensil is made of aluminum, which is especially the case with electric frying pans. The wire grate or lattice 17 is made of zinc-coated steel wire. The aluminum jacket of the tubular heating element 18 is pressed into a triangular form during the insulation material compression step. The wire grate 17 can stretch over a large area, for example, over the entire base of a cooking utensil, which also provides a guarantee of excellent anchoring and more even distribution of heat in the case of a thin-walled base.

Figure 12:
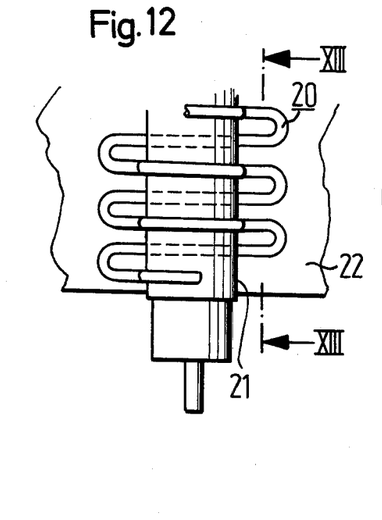
FIG. 12 is a plan view of elements being joinged according to the method of the present invention.
Figure 13:
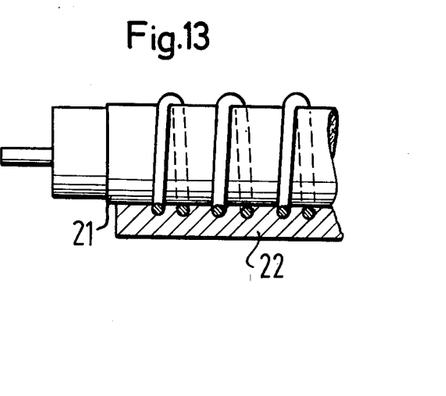
FIG. 13 is a sectional view in the direction of the arrows XIII—XIII in FIG. 12.

Referring now to FIGS. 12 and 13, this embodiment differs from the example shown in FIGS. 1 to 3, in that in the examples shown in FIGS. 12 and 13, a wire coil 20 is used, which is harder than the jacket 21 of the tubular heating element. The coil 20 consists of chromium-nickel steel wire, and is pressed onto a base 22 of a casting tool. The tubular heating element 21 has an external diameter of 6.5 millimeters and the diameter of the wire coil 20 is 10.5 millimeters, with the diameter of the wire amounting to 0.8 millimeters. A suitable die pressure was found to be 10 tons per centimeter of length of the tubular heating element. The end product differs in practice most substantially from the type of design shown in FIGS. 2 and 3 which can be seen from the diagrammatic presentation. The wire loops which run over the jacket of the tubular heating element retain basically their transverse section form in the type of design shown in FIGS. 12 and 13, that is, they are not pressed flat and the anchoring of the wire loops which extend to the side is determined with utmost precision. This embodiment shows that as a result of the appropriate selection of the materials, specifically the hardness of the tubular heating element, the wire loops and the plate, one can achieve different results, which will have different advantages, depending on the intended application or purpose of the device.

The loops of the wire coil which extend to the side can be also connected by welding, particularly by roll-seam welding, for example with sheet metal. This is recommended when because of the thinness of the sheet metal, for example on a side of the container, it is not possible to press the loops of the wire coil, which extend to the side, into the material without damaging it, or when it is possible to do so only to a certain extent, or when otherwise the joint would not be sufficient for the expected thermal or mechanical requirements. The particular advantage of the development according to the invention lies in the fact that the loops of the wire coil which extend to the side operate as welding studs.

Figure 14:
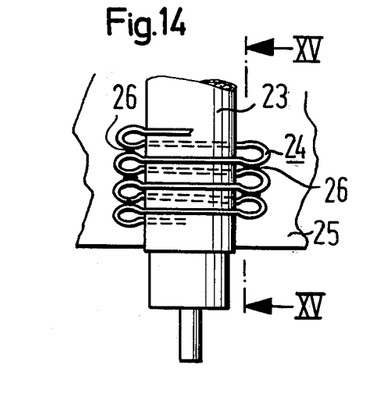
FIG. 14 is a plan view of elements being joined by another variation according to the invention.
Figure 15:
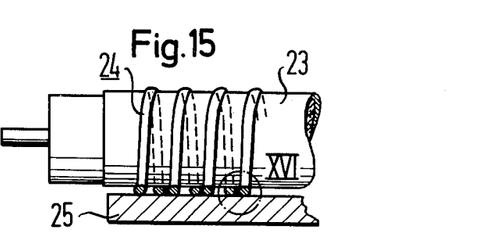
FIG. 15 is a sectional view in the direction of the arrows XV—XV in FIG. 14.
Figure 16:
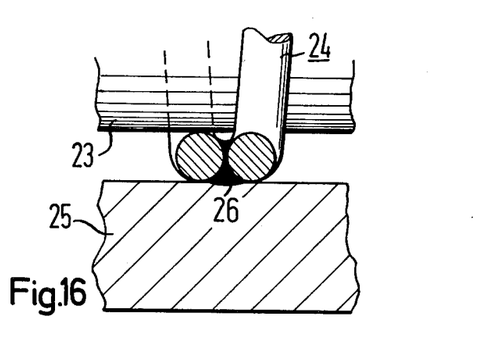
FIG. 16 is an enlargement of the encircled portion of FIG. 15.

An example of this embodiment produced by the method according to the invention is shown in FIGS. 14, 15 and 16. The tubular heating element 23, the coil 24, and the sheet metal 25 are all made of chromium-nickel steel. The welding points shown typically at 26 were produced by point welding or seam welding. The sheet metal 25 was 0.5 millimeters thick. Although the rear side of the sheet metal 25 showed a light dotted coloring at the welding places, the rear side remained otherwise entirely without any damage.

The example shows that on the one hand, if the method according to the invention is used, it is also possible to make the joints when stainless chromium-nickel steels are used, and that on the other hand one can also obtain very good joints on thin sheet metal. By using these joints, one can for example heat from the outside containers such as washing machines, dishwashers, heaters using liquid fuel—a problem which so far has not been solved in a satisfactory manner, although heating from the outside has unquestionable advantages, because the washing fluid or the washing does not come in contact with the tubular eating element, and the method provides for a large heat transmitting area.

Figure 17:
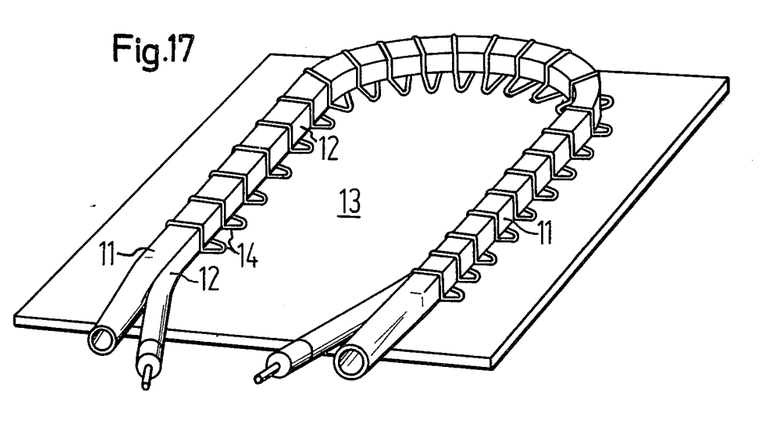
FIG. 17 is a perspecitve view of a filter heater for coffee percolators and simlar appliances according to the method of the present invention.

FIG. 17 serves to further clarify the design embodied in FIGS. 7 to 9 and shows in perspective the total setting consisting of a water tube 11 and a tubular heating element 12 attached to discharge plate 13.

Figure 18:
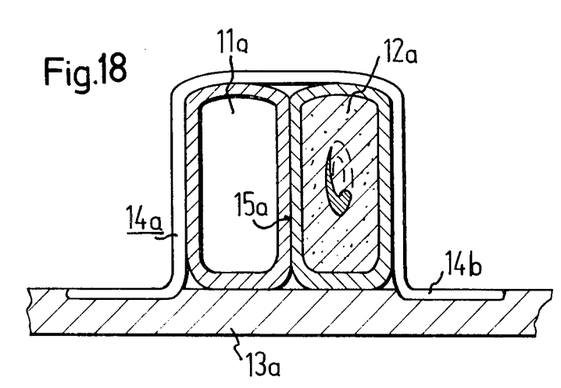
FIG. 18 is a sectional view of a modified design of joining of two tube profiles by means of the method of the present invention.

FIG. 18 shows a transverse section of a type of design of a water flow heater which is modified in accordance with FIG. 7, and is used for example for coffee percolators, where it gives particularly good results. A water tube 11a has a somewhat rectangular transverse section, in which the shorter sides of the rectangular cross section are rounded or arched. The tubular heating element 12a has a similar transverse section. The grouping consisting of the water tube 11a and the tubular heating element 12a is pressed into the aluminum sheet 13a by means of a wire coil 14a, in which a foot loop 14b is pressed out of each winding of the wire coil 14a, with this foot loop then being anchored in the aluminum sheet 13a. In this type of design, one obtains also a relatively large heat transmitting area shown typically at 15a between the water tube 11a and the tubular heating element 12a. In addition to this, the groupings provide particularly favorable even flow characteristics when steam pressure is utilized as a source of propulsion for the high pressure of the water column. This steam pressure is produced by the steam which forms in the water tube 11a. When the grouping consisting of the water tube 11a and the tubular heating element 12a is bent obliquely to the axis, for example in the form of a horseshoe, it is preferable that the tubular heating element 12a be located inside. In that case, the height of the rectangular transverse section of the tubular heating element 12a can be somewhat smaller than the transverse secion of the water tube 11a.

Figure 19:
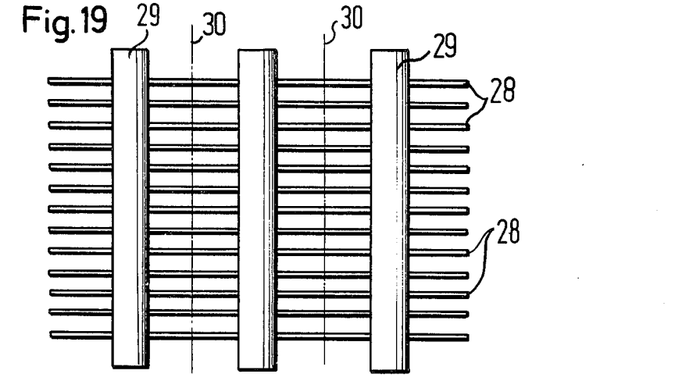
FIG. 19 is a plan view of elements being joined by another version of the method of the present invention.
Figure 20:
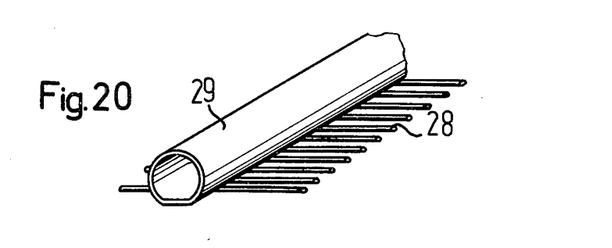
FIG. 20 is a perspective view of a portion of the element shown in FIG. 19.

FIGS. 19 and 20 show another variation of the method according to the invention. A collection of parallel wires shown typically at 28 is produced by any type of means and pipes, rods, tubular heating elements, or similar items are located such that the distance therebetween is greater than the size of the profile. The wires 28 are arranged to run perpendicularly to the axis of the profile 29. The electrodes of a welding equipment are placed to the wire 28 and to the profile 29, and the wires are welded to the tube profile 29 at the points of contact. Following that, the wires are cut along the separation line 30 which runs in the middle between the tube profile 29, so that there forms an element which is shown in FIG. 20. It should be understood that the production of the elements shown in FIG. 20 can be handled on a continuous basis, so that the wire 28 runs for example from corresponding supply spools, and the profile 29 is put on automatically at a station and then welded. The cutting is done at the following station, always in a continuous movement forward of the groupings by a length which corresponds to the distance between the two tube profiles. Instead of welding, or in addition to it, this operation can be followed by pressing the wire 28 onto the profile 29. The profile elements shown in FIG. 20 can be fastened to other profile elements, plate, sheet metals, or other materials in such a way that the protruding ends of the wires 28 can be pressed into the other elements or welded onto them. The wire ends c an also be bent in the process around the profile, which results in a particularly good joint. They can be also bent directly as shown in FIG. 20 under and aound other profile elements, or they can be pressed into a suitable plate.

Figure 21:
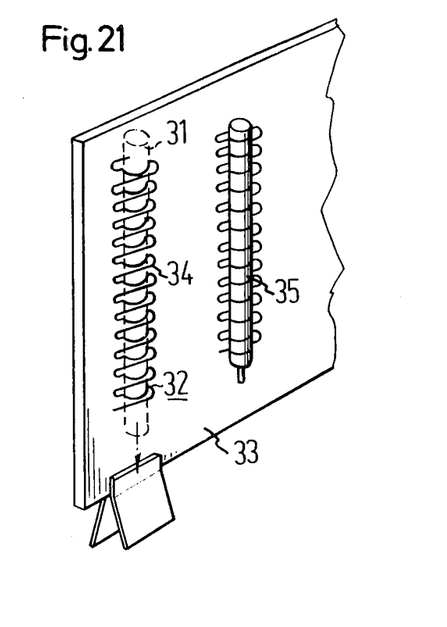
FIG. 21 is a perspective view showing another variation of joining elements according to the method of the present invention.
Figure 22:
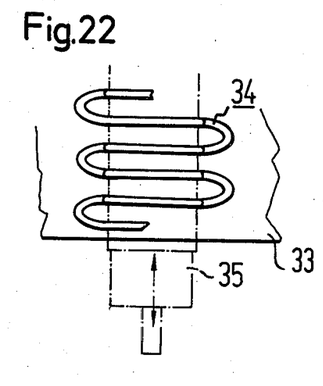
FIG. 22 is an enlarged plan view of a portion of the elements shown in FIG. 21.
Figure 23:
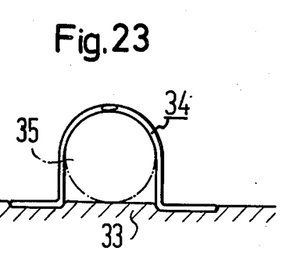
FIG. 23 is a cross sectional view of the elements shown in FIG. 22.

FIGS. 21 and 23 present another type of design produced by the method according to the invention. A rod shown in phantom at 31 is made of a very hard metal and is inserted into a wire coil 32, the diameter of which is about 1½ times greater than the diameter of the rod 31. Finally, the unit consisting of the rod 31 and the coil 32 is pressed on a plate 33 which may be, for example, the wall of a container, in a die press which preferably has a groove corresponding to the rod 31. At the same time, as has been described in the previous types of design, the foot loops 34, which will be anchored to the wall of the container 33, are pressed from the wire coil. Since the rod 31, consists of a very hard material, as mentioned previously, the wire coil 32 is not pressed into the metal rod 31. The metal rod 31 is then removed in the direction of the arrow, so that a wire cage is formed, which is anchored on the wall of the container 33 with foot loops 34. A tubular heat element 35 can then be inserted in such a way that it is firmly held, yet may be easily removed from replacement or repair. Furthermore, it is not necessary that the wire cage be formed in a straight line. In the case of insulation of panel heating elements, the wire cage can also be made of loops in the form of a U. Then the heating element which is used must be flexible, such as a heating coil which has insulation which is heat transmissive placed loosely around it. The heating element then follows all the curves of the wire cage, when it is inserted.

Figure 24:
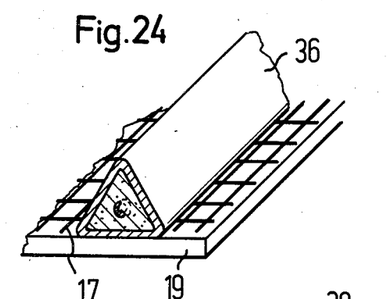
FIG. 24 is a perspective view of elements being joined together by another variation of the present invention.

FIG. 24 explains in an enlargement and variation of FIG. 10 the case where a tubular heating element 36 or other cord, rod, or tube profiles are pressed onto a wire lattice 17 in any number and combination. Finally, the arrangement is pressed on a plate 19, thereby providing the free surfaces of the lattice 17 to be used for any further connections which may be made according to the teachings of the present invention.

Figure 25:
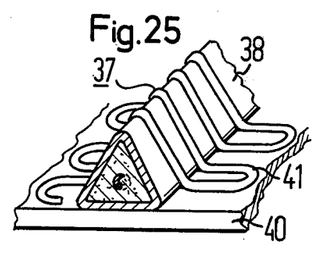
FIG. 25 is a perspective view of elements being joined together by the method of the present invention.
Figure 26:
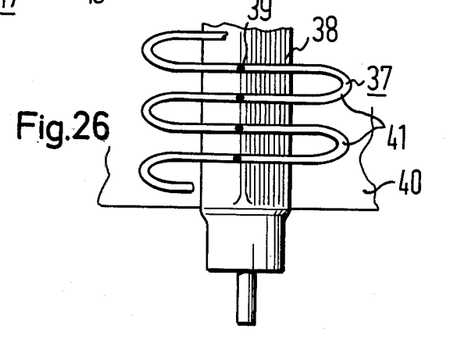
FIG. 26 is a plan view of the elements shown in FIG. 21 before the imprinting of the meandering wire strips.

FIGS. 25 and 26 explain the case where a meandering type of wire strip 37 which does not encircle the element to be fastened is utilized. Wire strips of this kind can be installed in a relatively simple way. The meandering type of wire strip 37 may be first attached to a tubular heating element 38 having almost any profile, by means of spot welding as indicated typically at 39. This results in a product which can be sold as is, or may be retained for further assembly at some later time. In such further assembly, the tubular heating element 38 is fastened onto a plate 40 and the lateral wire loop 41 of the meandering strip is pressed into the plate 40 and/or fastened to it by soldering or welding. At the same time, this process can be accompanied by pressing of the round transverse section of the tubular heating element, for example into a triangular form.

The pressing of tubular heating elements or other tubes, rods, or cord profiles onto thin sheet metal can lead to stresses in the sheet metal and, in fact, the sheet metal can crack, particularly when the arrangement is put under thermal or mechanical stress.

Figure 27:
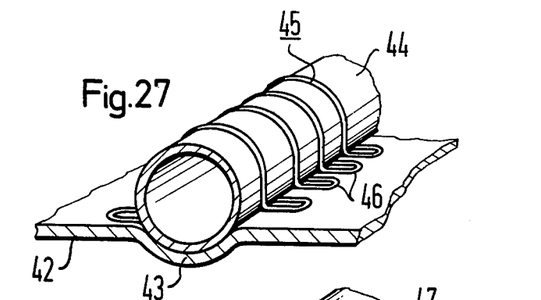
FIG. 27 is a perspective view of elements joined together by the method of the present invention.

According to the type of design presented in FIG. 27, stresses of this kind are avoided by pressing into the sheet metal 42 a groove 43, which takes up the longitudinal profile of the tube 44. The groove 43 is specifically made in such a way to assure that a die press can be used to press the arrangement consisting of the tube profile 44 and the wire coil 45 onto the plate 42. The die has a groove which corresponds to the groove 43 on the side placed against the tube 44 and, of course, the plate of the press which is placed against it has a groove which corresponds to the tube profile 44. When the press closes, the individual windings of the wire coil 45 are placed against the jacket of the tube profile 44 and extended elastically. During the closing process, foot loops 46 are pressed out of the wire coil 45 and anchored into the plate 42. When the press process is completed, the pipe 44 is also pressed somewhat into the groove 43 with an elastic stress, which will not change in the course of time, or if it does change it will be only slightly. When stresses are formed in the sheet metal 42 and in the joint of the arrangement as a result of thermal loads, these loads may be absorbed by the groove 43, which will also expand when the sheet metal 42 expands. Similarly, a good contact is retained, since the individual harnessed windings of the wire coil 45 will insure that the tube profile 44 remains firmly in the groove 43.

Figure 28:
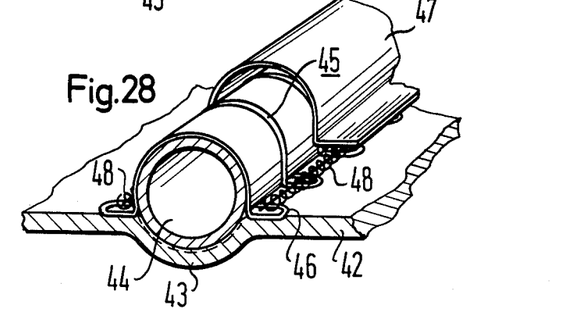
FIG. 28 is a perspective view of elements joined together and including a cover sheet, before being fastened by means of the method of the present invention.
Figure 29:
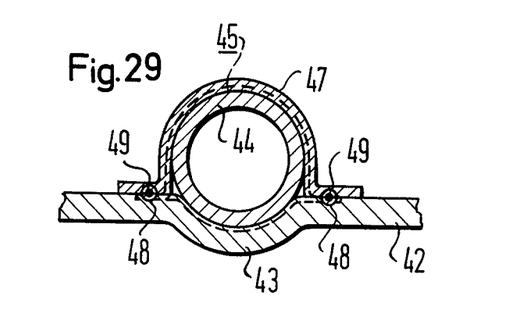

According to the type of design presented in FIGS. 28 and 29, cover plate 47 in the form of a strip is used in addition to the type of design shown in FIG. 27. In order to make sure that good joining is obtained between the cover plate 47 and the plate 42, wire coils 48 are attached along side the groove 43. These are pressed against the core wire 49. The material of the cover sheet 47 and of the plate 42 are pressed together over the tops of the wire coil 48 which is attendantly anchored in each of them. The cover sheet 47 may be removed during the pressing of the tube profile 44 and the wire coil 45, but it is easily arranged so that the two operations are carried out one after the other.

Although the cover sheet 47 serves to protect the setting, at the same time, the heat transmission properties are also improved. The use of a cover sheet 47 is preferable, for example, in the case of cooking utensils having a base which is heated by an electric tubular heating element, and in the case of space heaters in the form of panel-type heating elements, and in all other cases where, for aesthetic reasons, or because of easier cleaning of the upper surface of the tube profile, the wire coil 45 which has been pressed on is neither visible nor accessible.

A particular favorable design from the standpoint of cost of manufacture can be attained if the profile of the tubular heating element is made from nonalloyed steel which is left unprotected on the top, and the joining elements are made from zinc coated steel wire. If the sections of the wire or the width of the mesh of the wire lattice are kept correspondingly small, then the tubular heating elements are protected against corrosion by the zinc layer which operates as a protective electrode. It is of course, undertstood that combinations made of other metals can be also used, as long as the wire operates as a protective electrode.

What is claimed is:

1. A method of cold-joining metal parts together comprising the steps of providing at least one metal part having a substantially tubular shape, providing a metal part which is substantially flat, providing a structure formed of wire wherein wire portions of said structure are disposed substantially parallel one to another, positioning said wire structure into contact with said tubular part such that said wire portions are substantially perpendicular to the length of said tubular part, compressing said tubular part and said wire structure together to form a bonded relationship, positioning the bonded together parts in contact with said flat part, and fastening said structure formed of wire onto said flat part.

2. The method of claim 1 comprising the further steps of forming said structure of a coil of wire of diameter substantially larger than the diameter of said at least one tubular shaped part, inserting said tubular part into said coil, compressing said coil on both sides of said tubular part to form loops, and fastening said loops onto said flat part.

3. The method of claim 2 wherein the step of providing at least one tubular part comprises the step of providing an electrically powered heating element, providing a coil of diameter one and one-half times larger than the diameter of the heating element, and wherein said step of providing a flat part comprises providing a cooking utensil having flat portion and welding said loops to said flat portion.

4. The method of claim 1 comprising the further steps of forming said wire structure in a meandering zigzag shape of width twice the diameter of said tubular part, compressing said meandering wire structure onto said tubular part such that loops are formed on both sides of said tubular part, and welding said loops to said flat part.

5. The method of claim 1 wherein the step of providing at least one metal part having a substantially tubular shape comprises providing an electrically powered heating element.

6. The method of claim 5 wherein the step of providing at least one metal part having a substantially tubular shape comprises the additional step of providing a water-flow tube disposed along side said electrically powered heating element.

7. The method of claim 5 wherein the step of providing said flat part comprises the step of providing a cooking utensil having a flat portion and fastening said electrically powered heating element to said portion of said cooking utensil by welding said wire loops to said portion of said cooking utensil.

8. The method of claim 5 wherein the step of providing said wire structure comprises providing a coil of diameter larger than the diameter of said heating element and of a hardness less than that of the jacket of said heating element but greater than that of the flat part and wherein during the step of compressing the coil with said heating element said wires are pressed flat in the area of the jacket of the heating element and wherein the step of fastening said coil to the flat part is accomplished without any substantial deformation of its transverse section at that location.

9. The method of claim 1 wherein the step of providing at least one tubular part comprises providing a plurality of heating elements and arranging the wire structure to be disposed between said plate part and said tubular heating elements which are arranged substantially cross-wire to said parallel wire portions with a distance between each other which is greater than the diameter of the tubular parts and wherein the step of compressing said tubular parts with said wire structure further comprises the step of cutting off the end portions of the wire structure to form a plurality of short wire lengths arranged substantially parallel to each other, and the further step of fastening each end of said plurality of parallel wire lengths to said flat part.

10. The method of claim 1 comprising the further steps of compressing said tubular part onto said flat part thereby forming a groove on one side of said flat part and a convex deformation on the other side of said flat part opposite said tubular part so that the tubular part becomes attached to said resulting groove, and fastening the ends of said wires to the edges along said groove.

11. The method of claim 1 comprising the further steps of providing an additional metal sheet part, positioning said metal sheet over the length of said at least one tubular part, and fastening said sheet metal part onto said wire structure.

12. The method of claim 11 comprising the additional steps of providing at least two additional metal strips, positioning said metal strips adjacent to said tubular part such that when said sheet metal part is fastened said metal strips will be disposed between said sheet metal part and said flat part.

13. The method of claim 12 comprising the further step of forming said metal strips of a material having a high coefficient of thermal conductivity.

14. The method of claim 1 comprising the further steps of forming said wire structure in part of a material which is electronegative in relation to the material of said tubular part whereby said wire structure forms a protective electrode for said tubular part.

15. The method of claim 14 comprising the further steps of forming said tubular part of non-alloyed steel and coating said wire structure with zinc.

16. A method of cold-joining metal parts together comprising the steps of: providing at least one metal part having a substantially tubular shape, providing a metal part which is shaped substantially flat, providing a wire structure, providing a hard metal rod, positioning said wire structure over said flat part with said metal rod disposed therebetween, compressing said wire structure on both sides of said rod such that the wire structure is fastened to the flat part, withdrawing said rod from between said two parts, and inserting said tubular part into the space vacated by said metal rod.

* * * * *